US008806479B2

(12) United States Patent
Alpern et al.

(10) Patent No.: US 8,806,479 B2
(45) Date of Patent: Aug. 12, 2014

(54) CREATING AN APPLICATION VIRTUAL MACHINE IMAGE BY ISOLATING INSTALLATION ARTIFACTS IN SHADOW AREA

(75) Inventors: Bowen L. Alpern, Peekskill, NY (US); Glenn Ammons, Albany, NY (US); Vasanth Bala, Rye, NY (US); Todd W. Mummert, Danbury, CT (US); Darrell C. Reimer, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 1492 days.

(21) Appl. No.: 11/758,230

(22) Filed: Jun. 5, 2007

(65) Prior Publication Data

US 2008/0307414 A1    Dec. 11, 2008

(51) Int. Cl.
*G06F 9/455*    (2006.01)
*G06F 9/445*    (2006.01)

(52) U.S. Cl.
USPC .............................................. 718/1; 717/175

(58) Field of Classification Search
USPC .............................................. 718/1; 717/175
See application file for complete search history.

(56) References Cited

U.S. PATENT DOCUMENTS 6,584,118 B1    6/2003    Russell et al.

(Continued)

OTHER PUBLICATIONS

Alpern et al., "PDS: A Virtual Execution Environment for Software Deployment", VEE'05, Jun. 11-12, 2005, pp. 175-185.*

(Continued)

*Primary Examiner* — Abdullah Al Kawsar
*Assistant Examiner* — Brian Chew
(74) *Attorney, Agent, or Firm* — Jose Gutman; Fleit Gibbons Gutman Bongini & Bianco PL (57) ABSTRACT

A novel method is disclosed for capturing an installed state of a conventional application and converting the captured state into a virtual application. The novel method starts with a bare machine in a known state, preferably soon after the OS was installed. Installation scripts are used to install one or more software applications along with required components and dependencies. Other artifacts can be added and configured such as files, trees, directories, entries, data, values, among others. These also may include updates to various system databases, such as the Windows registry in which certain metadata is stored. The installed applications are tested and verified to work as desired. Undesired artifacts can be deleted manually or removed by the OS. The state of the virtual machine with the installed applications is captured. The installed applications can be tested on the frozen virtual machine. If the user determines that the installed applications are working properly, a virtual machine image is prepared and then written out. The resulting output is a new populated virtual application container that encapsulates the applications installed and configured by the user. If the user determines that one or more installed applications do not work properly during testing, then the frozen virtual machine can be unfrozen and any deficiencies corrected. The virtual machine image is stored as a launch document and a set of shards. The virtual machine image represents the state of the virtual machine along with the installed applications at the time the preparation virtual machine was frozen.

16 Claims, 7 Drawing Sheets

(56) References Cited

U.S. PATENT DOCUMENTS

| | | |
|---|---|---|
| 6,704,326 B2 | 3/2004 | Russell et al. |
| 6,802,054 B2 | 10/2004 | Faraj |
| 7,062,567 B2 | 6/2006 | Benitez et al. |
| 7,356,679 B1 * | 4/2008 | Le et al. .............. 713/1 |
| 7,577,722 B1 * | 8/2009 | Khandekar et al. ........... 709/220 |
| 8,032,351 B2 * | 10/2011 | Stringham .............. 703/21 |
| 2004/0174902 A1 | 9/2004 | Russell et al. |
| 2005/0262042 A1 | 11/2005 | Kondo |
| 2006/0047974 A1 * | 3/2006 | Alpern et al. ............ 713/191 |
| 2006/0218544 A1 * | 9/2006 | Chakraborty et al. ........ 717/168 |

OTHER PUBLICATIONS

Dmitriev, M., Safe Class and Data Evolution in Large and Long-Lived Java Applications, University of Glasgow, Department of Computing Science, Mar. 2001.

Smaragdakis, Y., et al., "Mixin Layers: An Object-Oriented Implementation Technique for Refinements and Collaboration-Based Designs," ACM Transactions on Software Engineering and Methodology, vol. 11, No. 2, Apr. 2002, pp. 215-255.

Gladney, H.M., et al., "Trustworthy 100-Year Digital Objects: Durable Encoding for When Its Too Late to Ask," ACM Transactions on Information Systems, vol. 23, No. 3, Jul. 2005, pp. 299-324.

* cited by examiner

CREATING AN APPLICATION VIRTUAL MACHINE IMAGE BY ISOLATING INSTALLATION ARTIFACTS IN SHADOW AREA

STATEMENT REGARDING FEDERALLY SPONSORED RESEARCH OR DEVELOPMENT

This invention was made with Government support under Contract no.: NBCH3039004 (DARPA) awarded Defense Advance Research Projects Agency. The Government has certain rights in this invention.

FIELD OF THE INVENTION

The present invention relates generally to virtual machines and more particularly to methods of creating virtual machine images on a computer system.

BACKGROUND OF THE INVENTION

The use of virtualization as a software abstraction of the underlying hardware machine was developed by The IBM Corporation in the 1960s. See: *The IBM Mainframe, history and timeline*, at. Virtualization refers to the interception of an application's communication with its underlying runtime platforms such as the operating system (OS) or a Java Virtual Machine (JVM). See: *The Java Virtual Machine Specification, 2nd Ed.*, by: Lindholm, T., Yellin, F., Addison-Wesley, Reading, Mass., 2000. Virtualization can be used to give an application the illusion that it is running in the context of its install machine, even though it is executing in the (possibly different) context of a host execution machine.

Conventional full-system virtualization techniques emulate a hardware machine on which an operating system (possibly distinct from that of the host execution machine) can be booted. Full system virtualization incurs a significant performance penalty, and is primarily intended for testing and porting across different operating system platforms. Assuming that installed images are always platform specific (e.g., a Windows/x86 and a Linus/x86 application will each have a separate platform-specific installed image), then much of the host execution machine's operating system and hardware interfaces can be used directly without virtualization. This selective virtualization approach incurs significantly lower performance overhead than full-system virtualization and is practically indistinguishable from direct execution performance.

Full-system virtual machines can be cloned to make new virtual machines. However, the resulting virtual machine images are very large (typically tens of Gigabytes). Another way a new full-system virtual machine can be created from an old one is with a differencing disk which contains the changes that need to be made to the old machine to obtain the new one. Differencing disks are typically smaller than cloned full-system virtual machine images, but still quite large, and the virtual machine image of the old machine is also needed to run the new one.

Virtual machines (VM), particularly those that attempt to capture an entire machine's state, are increasingly being used as vehicles for deploying software, providing predictability and centralized control. The virtual environment provides isolation from the uncontrolled variability of target machines, particularly from potentially conflicting versions of prerequisite software. Skilled personnel assemble a self-contained software universe (potentially including the operating system) with all of the dependencies of an application, or suite of applications, correctly resolved. They then have confidence that this software will exhibit the same behavior on every machine, since a Virtual Machine Monitor (VMM) will be interposed between it and the real machine.

Because software deployment is a relatively new motivation for using virtual machine technology, today's VM-based software deployment efforts employ VMs that were originally designed for other purposes, such as crash protection, low-level debugging, process migration, system archival, or OS development, and are being re-purposed for software deployment.

Many users today require their own virtual machine images which are specific to their own software/computing needs. However, deployment can often be complicated particularly in those instance in which several different applications produced by separate software organizations need to be integrated on the same machine. An example of such a scenario could be a suite such as MySQL/JBOSS/Tomcat/Apache, a Java development tool such as Eclipse, and a J2EE application that needs to be developed using Eclipse and tested on the MySQL/JBOSS/Tomcat/Apache suite. See: *MySQL, 2nd Ed.*, by: DuBois, P., Sams Press, March 2005. See: *JBoss 4.0-The Official Guide*, by: The JBoss Group, Sams Press. April 2005.

A complex collection of applications may often have conflicting pre-requisites. Each application may require its own version of the JVM, for example, or depend on specific patch-levels of certain dependent components. VMMs can help tame such conflicts by allowing each application's dependencies to be embedded in its private VM image. Vendors deal with dependency conflicts in more or less the same way. Vendors try to reduce dependency conflicts by embedding the application's dependencies into the application installed image, usually without the benefit of VM technology. For example, Eclipse version 2.x comes bundled with Tomcat, which is used for rendering the Eclipse help pages. Similarly, JBOSS distributions also include an embedded version of Tomcat. Many commercial Java middleware products embed one or more JVMs in their images. This trend has also be reflected within a single software product. For example, the module org.apache.xerces is often duplicated in several different components in an effort to isolate these components more fully from one another. A VMM adds is a kind of guarantee that the isolation between conflicting software stacks is provably complete, lacking in subtle holes.

But, whether assisted by a VMM or not, incorporation of dependencies without any compensating measures results in increasing software bloat. From a disk space perspective, tolerating bloat is no longer a relatively big problem in the art. But an isolation strategy accomplished through physical code duplication creates other problems. It can slow down the deployment process, and increase the number of components that need to be configured at deployment time, or touched during subsequent updates. It may also increase the customer's perception of an application's complexity, which in turn increases customers' reluctance to update frequently. This can result in a proliferation of software versions in the field and increasing support and services costs over time.

Also, data center environments are increasingly moving toward a scale-out model where large farms consisting of several thousand commodity servers are becoming commonplace. In such scenarios, hardware failures can occur frequently, often several times a day. The cost of commodity hardware is relatively low so operators can often deal with hardware failures by simply replacing the defective machine on a rack, and re-provisioning the new machine with the application suite. Large commercial software stacks can take hours to provision, thus increasing the cost of such failures.

Using any VMM to help with provisioning can speed this up by replacing the normal installation process with an easily-moved image. But, unless specific steps are taken to deal with the underlying code bloat, just the process of moving the bits may cause slowdown. Reversing the trend toward increasing code bloat due to duplication-based isolation techniques might prove valuable in such situations. A properly engineered solution may also take into account that a software application can usually begin executing when only a fraction of its bits are present.

A software deployment system assumes that the software it deploys in one offering is not the only software offering deployed on the target machine. Each machine owner assembles a palette of offerings that suits his or her needs. These offerings must be able to inter-operate both via system-mediated communication channels (e.g., semaphores, pipes, shared memory) and via files in a common file system.

Consider the implications for a VMM-assisted deployment. If all offerings were run in the same VM instance, the isolation advantages of using a VM will be lost since the offerings might then conflict. But, if each offering is run in a different VM instance using the usual hardware virtualization paradigm, the inter-operation between offerings takes on characteristics of inter-machine communication rather than intra-machine communication. What seems like one machine to the user is now laced with remote file mounts and distributed protocols. Somehow, the degree of isolation must be relaxed to permit a more local style of inter-operation. The relaxation must be done while still managing conflicts and reducing variability in the areas that matter to correct execution.

Making this change involves tradeoffs. A more porous isolation between VMs enhances the user experience when integrating software on a single machine. However, other characteristics that one might expect from a general-purpose VMM (such as crash protection or the ability to freeze and migrate processes) might be sacrificed.

A spectrum of virtual machines are in use today. These range from runtime environments for high-level languages like Java. See: *The Java virtual machine specification, 2nd Ed.*, by: Lindholm, T., Yellin, F., Addison-Wesley, Reading, Mass., 2000, and Smalltalk. See: *Smalltalk-80: the language and its implementation*, by: Goldberg, A., Robson, D., Addison-Wesley Longman Publishing Co., Inc., Boston, Mass., 1983, to hardware-level VMMs such as VMware, by: VMWare, Inc., and Xen. See: *XEN and the Art of Virtualization*, by: Barham, P., Dragovic, B., Fraser, K., Hand, S., Harris, T., Ho, A., Neugebauer, R., Pratt, I., Warfield, A., Proceedings of the 19th ACM Symposium on Operating System Principles, October 2003.

The level of indirection provided by the VM layer enables the software running above it to be decoupled from the system beneath it. This decoupling enables the VM layer to control or enhance the software running above it. VMM, such as VMware, seek to exploit the decoupling to fully isolate the software stack running above it from the host environment thus enabling sandboxed environments for testing, archival, and security. The VMM is often used to capture both the persistent and volatile state of a sandboxed environment to enable mobility of end-user environments over a network. Further, the VMM has been exploited for simplifying the deployment and maintenance of software environments. Utilities like Debian simplify the maintenance of software packages but do not provide isolation in the sense of enabling conflicting versions of a component to co-exist in the same (virtual) namespace.

Managed container frameworks like J2EE and .NET [http://www.microsoft.com/] provide network deployment and management features, but they are language specific, and require the use of framework APIs. Other language-specific solutions for software deployment and maintenance are Java Web Start and OSGi. Zap is an implementation of a virtualization layer between the operating system and the software. One of the objectives of Zap is migration of process groups across machines, not software deployment and serviceability. See: *The Design and Implementation of Zap: A System for Migrating Computing Environments*, by: Osman, S., Intravenous, D., Su, G., Nieh, J., ACM SIGOPS Operating System Review, Vol 36, Issue SI, December 2002. Others, such as AppStream [http://www.appstream.com/], Endeavors, and Softricity, use file-system based approaches to provide centrally managed software deployment and maintenance solutions for Windows desktops. Desktop applications are generally self-contained applications whose non-OS dependencies are easily be bundled within a single file system mount point, or self-contained directory.

There exists a need to overcome the problems discussed above, and, more particularly, a need to overcome the inefficiencies associated with deploying, updating and versioning software in a network system.

SUMMARY OF THE INVENTION

What is disclosed is a novel method for capturing an installed state of a conventional application and converting the captured state into a virtual application. The novel method starts with a bare machine in a known state, preferably soon after the OS was installed. Installation scripts are used to install one or more software applications along with required components and dependencies. Other artifacts can be added and configured such as files, trees, directories, entries, data, values, among others. These also may include updates to various system databases, such as the Windows registry in which certain metadata is stored. The installed applications are tested and verified to work as desired. Undesired artifacts can be deleted manually or removed by the OS. The state of the virtual machine with the installed applications is captured. The installed applications can be tested on the frozen virtual machine. If the user determines that the installed applications are working properly, a virtual machine image is prepared and then written out. The resulting output is a new populated virtual application container that encapsulates the applications installed and configured by the user. If the user determines that one or more installed applications do not work properly during testing, then the frozen virtual machine can be unfrozen and any deficiencies corrected. The virtual machine image is stored as a launch document and a set of shards. The virtual machine image represents the state of the virtual machine along with the installed applications at the time the preparation virtual machine was frozen.

The invention will next be described in connection with certain illustrated embodiments. It should be understood that various changes and modifications can be made by those skilled in the art without departing from the spirit or scope of the invention.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

A novel method is provided for capturing an installed state of a conventional application and converting the captured state into a new virtual machine application along with the application virtual machine monitor (VMM) responsible for mediating between the application and the underlying operating system (OS).

While the specification concludes with claims defining the features of the invention that are regarded as novel, the invention will be better understood from a consideration of the following description in conjunction with the drawings, in which like reference numerals are carried forward.

Briefly, in one embodiment of this invention, a virtual machine image is created from a bare virtual machine having a known state. Installation scripts install one or more applications onto the virtual machine along with required components and dependencies. Other artifacts can be added and configured such as files, trees, directories, entries, data, values, among others. These also may include updates to various system databases, such as the Windows registry, in which certain metadata is stored. The installed applications are configured to work as desired. The state of the virtual machine with the installed applications is then captured. A new virtual machine image is written out and stored as a launch document and a set of shards. The resulting output will be a new populated virtual application that encapsulates the installed applications configured by the user.

It should be understood that one skilled in this art would have a firm understanding of the process of virtualization, virtual machines, and their creation, installation and operation.

The invention is the result of research done with the Progressive Deployment System (PDS) developed by the IBM Corporation. A description of PDS is also provided in commonly owned US Pub. No. US2006/0047974 A1 to Alpern et al., which is incorporated herein by reference.

PDS is a development tool which provides a virtual environment for executing self-contained software universes (virtual assets) in which all dependencies, except dependencies on the underlying operating system and hardware, have been resolved. PDS supports the Windows OS and has been used to deploy software development tools such as Eclipse and WebSphere Studio Developer, productivity environments such as Open Office and Lotus Workplace Client, and server stacks such as Apache and Tomcat.

An asset, as used herein, is a unit of software capable of being executed, corresponding to an executable plus its configuration information, extending to all the processes it creates and all the software and resources needed to support those processes. An asset contains the transitive closure of all of its dependencies except for the base operating system. Thus, an asset is dependent only on the operating system.

A shard, as used herein, denotes an array of bytes that may be stored on disk. The shard is the atomic unit into which all assets are divided by PDS, and it is the unit of sharing across assets. A shard is not self-describing and includes no meta-information: it is just bytes. The shards of an asset typically represent either files, discrete pieces of files such as the members of archives, or convenient units of metadata. But, most generally, they can represent any information that supports the asset's execution.

An asset collection, as used herein, is a collection of assets including the union of the shards of all the assets in the collection. Within an asset collection there are no bitwise duplicate shards (and some shards may belong to more than one asset). The asset collection is the unit of preparation and deployment for PDS.

As used herein, a machine readable medium is an article of manufacture or a computer program product, such as a floppy disk, a high capacity read-only memory, an optically readable compact disc or CD-ROM or DVD, a tape, a transmission type media such as a digital or analog communications link, or the like commonly found in the arts which is capable of retaining thereon a computer executable program and/or computer readable data.

A shard execution cache (SEC), as used herein, is a shard source that is read-only to virtualizers and contains the shards that the virtualizers need; although not necessarily all the shards of any one asset collection.

A virtualizer (or virtual machine monitor), as used herein, is a component that intercepts some subset of an asset's communications with its supporting platforms such as the OS or a JVM. It redirects these requests so that significant resources are fetched from PDS instead of locally.

PDS intercepts a select subset of system calls on the target machine to provide a partial virtualization at the operating system level. This enables an asset's install-time environment to be reproduced virtually while otherwise not isolating the asset from peer applications on the target machine. Asset components, (or shards), are fetched as they are needed (or they may be prefetched), enabling the asset to be progressively deployed by overlapping deployment with execution. Cryptographic digests may be used to eliminate redundant shards within and among assets.

A framework is provided for intercepting interfaces above the operating system (e.g., Java class loading), enabling optimizations requiring semantic awareness not present at the OS level. PDS is also a viable solution to the problem of deploying and managing complex software stacks. By treating assets as immutable and with their own view of their virtual file spaces, along with the ability to share components between assets, PDS allows multiple assets to simultaneously execute on the same machine. In PDS, components (shards) are assigned the same name if, and only if, they have the same content. This allows the efficient delivery of many virtual assets which share common sub-components.

With the exception of a small bootstrap code (the PDS player), PDS's own virtualizers are embedded in every asset. As discussed herein further, the shard design ensures that the duplication is avoided in the physical shard storage. This allows assets to be unaffected by subsequent PDS virtualizer evolution, further enhancing the ability to service and support deployed assets in the field. The end-user's perceived complexity of the deployed environment is lowered, because its internal structure is hidden from the user. Serviceability of deployed environments is enhanced because every asset represents an immutable state of some installed image, and no user can have an image that is between two supported virtual machine versions.

PDS uses a selective approach to process-level virtualization which enables multiple assets to co-exist and interact as peers in the host machine environment without incurring a significant performance penalty. This enables multiple vendors to deploy different parts of a complex commercial environment, which would be difficult to accomplish with a full isolation sandbox approach based on a full-system VMM. On the other hand, PDS cannot isolate environments at an OS level the way that full-system VMMs can. Thus, the two approaches, system and application virtualization, are fundamentally complementary to one another.

High-level languages often use their runtime environments both to enhance the functionality of underlying hardware and OS and to achieve portability across hardware and OS implementations. Virtualization effectively masks the idiosyncrasies that arise within an OS instance as individual machines are configured differently.

Assets are designed to be deployed progressively, meaning that the transfer of the asset's bits to the target machine is overlapped with its execution. This advantageously enables replacement racks, for example, on a server farm, to be rapidly provisioned without waiting for an entire system image to be moved to the machine prior to starting its execution. Since assets are logically immutable entities, the user is assured that every asset, once tested, will not later fail due to an incompatible update. Any change to an asset, no matter how small, results in a new asset.

Assets are preferably isolated from each other in the sense that each one sees its own unique resources, such as: virtual files, directories, and system metadata, and not resources that are unique to some other asset. While assets cannot see any of the host machine's resources that were overlaid by their own virtual ones, they can see other local resources and can communicate with other programs running on the host machine including other assets running under PDS through the local file system and local interprocessor communication (IPC). The PDS virtualizer puts its assets on the same plane as ordinary programs by running above the OS rather than below it.

To execute a PDS asset, the PDS player must be installed on the host machine conventionally. A launch document is then obtained for the asset. This document contains a URL for a shard database and the shard identifier for the assets manifest. The manifest is a metashard that maps the names of objects as they appear to the PDS user and to processes running under PDS to shard identifiers. When a process requires an object, it requests it from the OS. PDS intercepts these requests which include the objects hierarchical name. It looks up this name in the manifest and finds the identifier of the associated shard. If the value of this shard has been cached on the local machine, this cached value is used to satisfy the processes request. Otherwise, the shard is fetched from the shard database and cached on the local machine; this value is used to satisfy the request.

Figure 1:
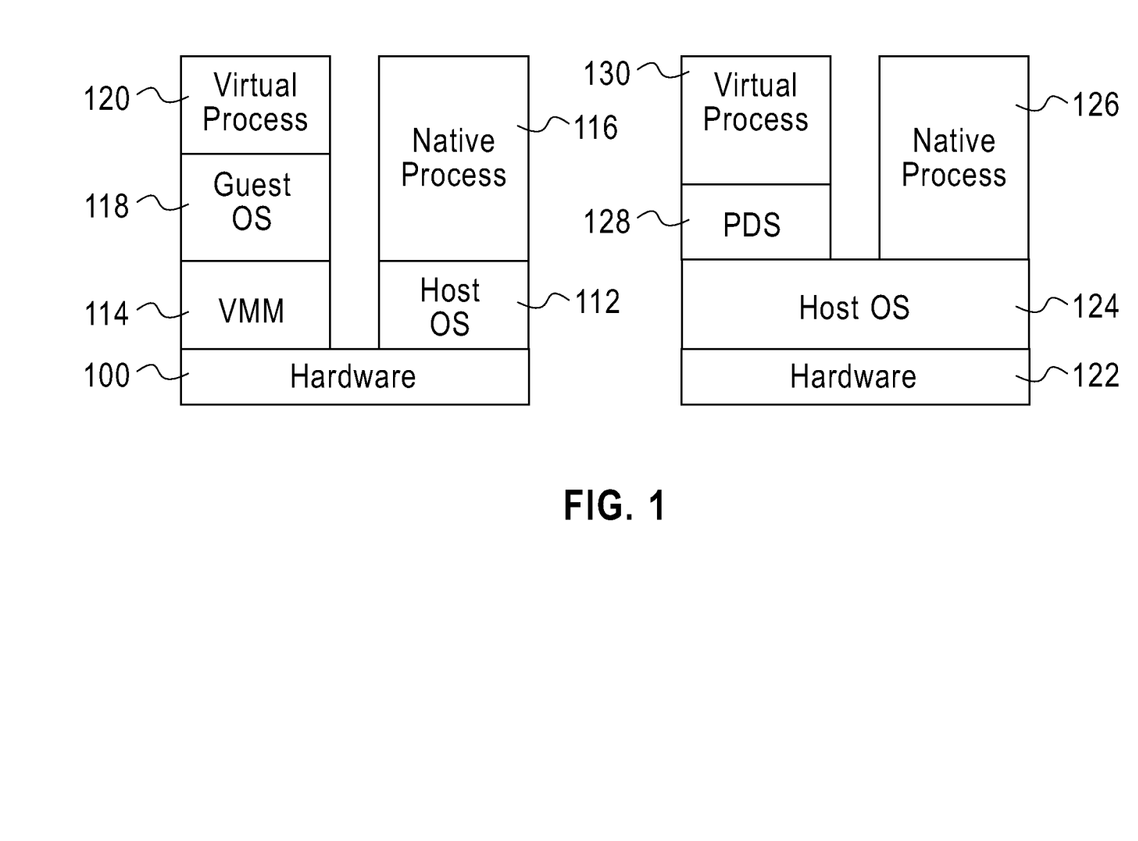
FIG. 1 illustrates the VMM execution stack of two platforms of one embodiment of the invention.

FIG. 1. illustrates the VMM execution stack of two platforms. Hardware 100 supports two stacks. One stack supports the execution of Host OS 112 supporting Native Process 116 and the other full-system VMM 114 executing Guest OS 118 which, in turn, is enabling Virtual Process 120. Hardware 122 supports a single Host OS 124 having two stacks. One stack supports the execution of Native Process 126 and the other PDS 128 running Virtual Process 130.

Without an effective mechanism for reducing redundancy between (as well as within) assets, the proliferation of virtual views would entail a prohibitive amount of space to store, and bandwidth to transport, many closely related assets. To address this, assets are partitioned into shards, variable-sized semantically determined "pages" that are the unit of transfer between a software repository and the host machine. Shards may correspond to files, semantically cogent portions of files, system metadata such as registry entries, or metadata used by PDS itself. Shards are freely shared across assets.

Figure 2:
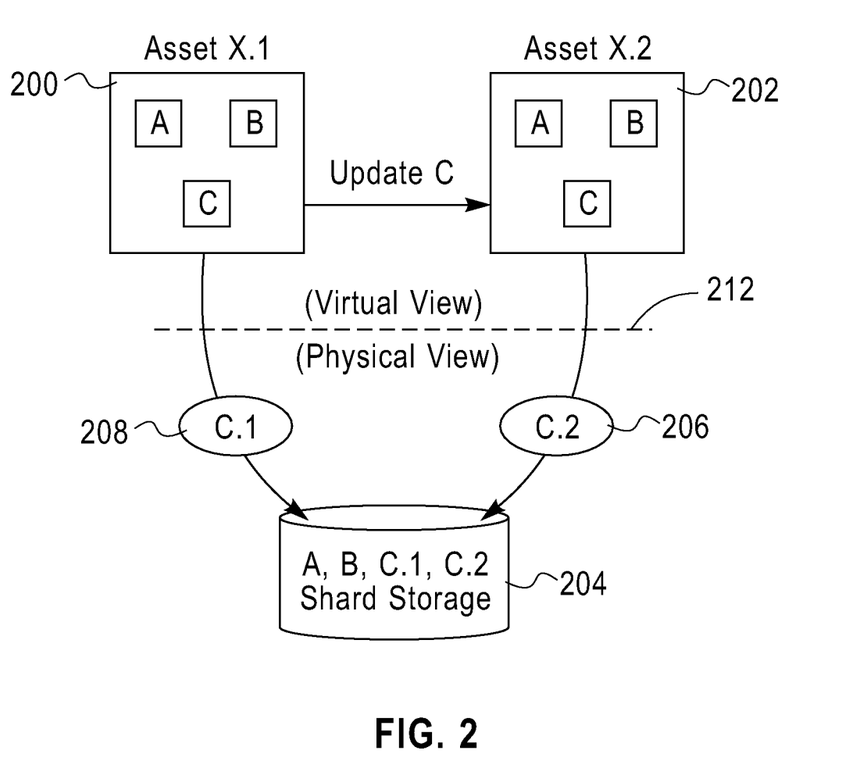
FIG. 2 illustrates one embodiment of the virtual vs. physical view of the PDS.

FIG. 2 illustrates the virtual vs. physical view of the PDS. A first Asset X.1 at 200 contains shards A, B, and C. A second Asset X.2 at 202 also contains shards A, B, and C. Bitwise identical shards are given the same physical name in storage 204 and are only stored once. Shards help maintain an appropriately scaled working set as the repertoire of assets in use on a machine evolves over time. Since shards are semantically determined, they allow redundant parts of highly similar assets to be detected and shared transparently while maintaining the illusion that each asset has its own copy. Thus, the duplication implied by the virtual view (shown above boundary 212) of an asset's evolution is not reflected in its physical storage manifestation (shown below boundary 212). Two versions of Asset X differing in component C is only reflected in the underlying physical shard storage. A reference to C from Asset X.1 at 200 is mapped to shard C.1 at 202. A reference to C from Asset X.2 at 202 is mapped to shard C.2 at 206.

The separation between virtual and physical views of asset composition enables the internal structure of the asset (e.g. containing components A, B and C) to be hidden from the end-user. The end-user need only see whole assets (Asset X.1, Asset X.2, etc.), and never need deal with lower level component patches, upgrades, versions, and/or configurations. Thus, end-users simply execute the whole asset version they are interested in, and the additional shards required for its execution will be transported automatically.

Figure 3:
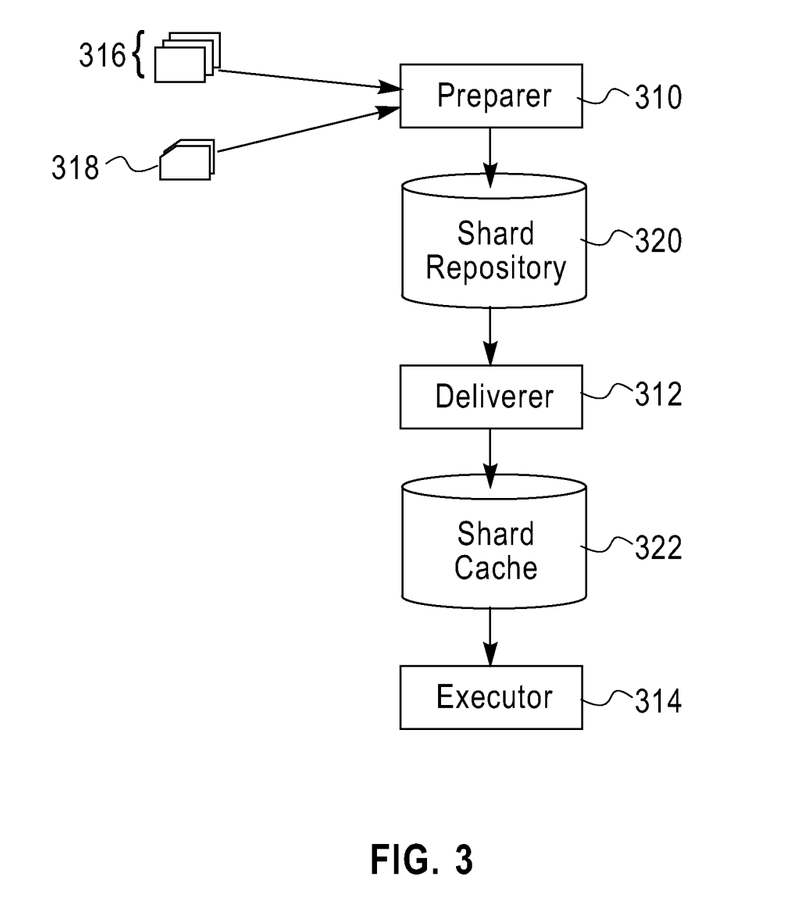
FIG. 3 illustrates the general organization of the PDS in one embodiment.

FIG. 3 illustrates the general organization of the PDS. The PDS is organized into three major components. In general, the Preparer 310 is a software plug-in within a preparation subsystem that serves the needs of a specific virtualizer. It produces assets from software that has been installed in the conventional fashion on a clean or otherwise empty machine (real or virtual). A capture phase, prior to preparation proper, is used to identify those components to prepare. As will be discussed herein further, asset preparation consists of breaking assets into shards, and organizing assets and their shards into asset collections. These asset collections are deployed into shard repositories. The preparation subsystem is "offline" and communicates with the rest of PDS only indirectly via the asset collections that it produces. Deliverer 213 makes assets present on a host machine by ensuring the appropriate shards are on hand when needed. Delivery consists of moving bits between different shard sources with the goal of having them available in the shard execution cache (SEC) when needed by PDS virtualizers. Executor 314 is the virtual execution environment which manages the execution of assets on the host machine. An execution subsystem announces its needs to the delivery subsystem to ensure that needed shards are in the SEC. The delivery subsystem may copy shards, if necessary, from a shard repository to the SEC and, in some instances, through intermediate shard sources. Typically, the Deliverer 213 will run in tandem with the Executor 314, although execution of the former could precede that of the later.

More specifically, Preparer 310 accepts as input a virtual machine comprising installed applications 316 and PDS virtualizers 318, along with an instruction set (not shown) and it produces a shard repository 320. The instructions given to the Preparer consist of an inventory of what is in the virtual machine plus a startup directive. Typical virtual machine inventories consist of a few directory/file trees but other kinds of system metadata may be listed. The startup directive is a command that executes on the target machine but inside the virtual environment in order to start the asset. Most assets have trivial startup directives but may alternatively be used to set environment variables or perform environment preparation not covered by the virtual machine's inventory.

In one embodiment, shard repository 320 is a file tree. Thus, within which each shard is a file. Shards are assigned identifiers so that two shards with the same contents will typically have the same shard identifier and two shards with different content will, with very high probability, not have the same shard identifier. One skilled in this art would appreciate that one way to achieve this is to us a cryptographic digest of a shard's contents as its identifier. In a shard repository, the path names of shards can be algorithmically derived from their shard identifiers for efficient retrieval. Bitwise-identical shards need only be stored once. This has the advantage of avoiding the redundancies implied by every asset containing all of its dependencies. The contents of two virtual files that share the same bit pattern can be represented by the same shard. These files can however have different names, creation dates, permission attributes, etc. PDS reconciles this by storing file metadata in the metashards, and have the primary shards contain only the file contents as will be discussed herein with reference to FIG. 4.

The shard repository produced by Preparer 310 contains all the shards of one or more assets under preparation. Primary shards are pieces of the application being prepared, or of its software dependencies, or of the PDS VMM as the pieces appear on the preparation machine. In a preferred embodiment, the preparation machine is an application virtual machine delivered as a PDS asset. Metashards contain control information generated by the Preparer and interpreted by the Executor. The redundancy avoidance enabled by the shard design also allows separately prepared repositories to be merged to form larger ones containing the shards of many assets but still storing each shard once. Deliverer 312 (and sometimes Executor 314) reads shards from shard repositories but does not mutate them in place. The Executor implements copy-on-write semantics for objects in the virtual machine.

Figure 4:
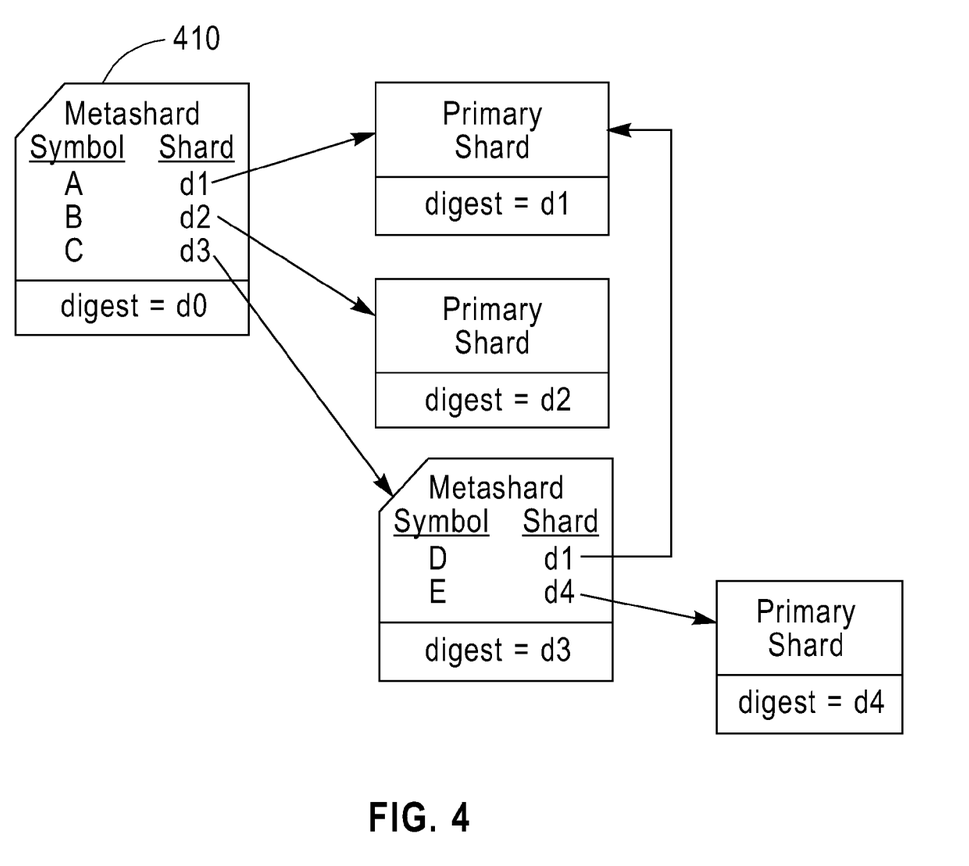
FIG. 4 illustrates one embodiment of how the metashards and shards are arranged.

With reference to FIG. 4, a metashard 410 generally comprises one or more symbols with each symbol having its own shard identifier. Shown in metashard 410 is symbols A, B, and C having shard identifier d1, d2, and d3 respectively. Every primary shard of an asset is referred to in at least one of the asset's metashards via its shard identifier. The metashards themselves form a tree linked by shard identifiers. Each identifier of the metashard at the root of this exemplary tree uniquely identifies the asset. Identifier d1 of metashard 410 identifies primary shard 412. Identifier d2 of metashard 410 identifies primary shard 414. Identifier d3 of metashard 410 identifies another metashard 416. Metashard 416 has symbols D and E each associated with identifier d1 and d4 respectively. Identifier d4 of metashard 416 points to primary shard 418.

Reference is again being made to FIG. 3. A launch document is a small document (not a shard) containing the asset id of an asset together with additional information that allows the Executor to interact with the Deliverer to obtain the shards of the asset. This information may specify the location of a shard repository containing the asset's shards. Although the interaction between Deliverer 312 and Executor 314 is typically file-based, small shards can also be read directly into memory.

When Executor 314 identifies the need for a particular shard, it passes the shard's identity to Deliverer 312, which blocks the calling thread until it is able to manifest the shard as a file. At which point, the path name of that file is returned to the Executor. The Executor then uses standard OS interfaces, including memory-mapping, to utilize the shard without modifying the shard.

Because the shard repositories are just file trees, a Deliverer 312 can use file system capabilities already present in the OS to map shard repositories into the local file space. Alternatively, the Deliverer employs physical media such as DVDs. The Deliver can copy shard repositories to local disk, or mount them as remote file systems. The problem of actually moving the bits is left to the file system. The Deliverer simply returns paths in the appropriate file system for each shard requested.

Deliverer 312 can alternatively employ a specialized client-server algorithm to transfer shards from a remote shard-repository to a local shard cache 322 that contains only those shards needed on the local machine. In this case, the Deliverer can implement sophisticated working set maintenance algorithms and pre-fetching of shards based on learned execution patterns. For further efficiency, it may also reorganize its shard repositories into alternate representations that do not use a file/shard relationship. A separable delivery subsystem enables alternative implementations to be plugged in that may be suitable for specific situations. The current PDS system implements two Deliverers, one file based, the other using the HTTP protocol and a standard servlet engine. The latter enables experimentation with the pre-fetching strategies and to operate in wide area networks without requiring the installation of specialized file system software.

With reference still being made to FIG. 3, the Executor 314 consists of a small bootstrap mechanism (PDS player) to launch a virtual machine on a client system, and a virtualizer (virtual machine monitor) to provide an execution environment.

PDS provides a virtualization that is selective to permit assets to inter-operate with other local applications via system APIs. PDS interposes a virtualizer between the application and the OS which will vary from OS to OS. The APIs that are intercepted in PDS's selective virtualization are just those needed to map the preparation machine onto the target machine as a virtual machine image. That is, they include the APIs that deal with files, directories, system metadata, and anything else that is found to be stored persistently at installation time. Although the bulk of these APIs are file-related, some virtual machines include information stored in specialized system databases not accessed via the file APIs (e.g., the Windows registry).

Virtual machine images may also include scattered files in system-managed directories, a pattern that cannot be duplicated via the hierarchical mounting capabilities of most operating systems. Finally, dynamic loading and dynamic binding between modules, although rooted in file I/O, has semantic details (search paths, versioning, etc.) that require additional intervention to ensure that the asset operates within its virtual machine image and isn't contaminated by artifacts in the real system. These subtleties can prove problematic for the kind of deployment PDS enables through alternative approaches such as remotely mounting file trees directly on a host machine.

PDS only intercepts a small subset of the full Windows API, limiting its interception to certain file-related APIs, registry APIs and those related to dynamic loading and process creation. All of the graphics, interprocess communication, network I/O, thread synchronization, and message formatting APIs are left alone, causing a PDS asset to be, in most respects, a peer of other programs running on the OS. Even within the file APIs, path directed requests, in which files are designated by hierarchical names, are distinguished from handle directed requests, in which files are designated by previously opened handles. As is the case with many distributed file systems, the former is intercepted but usually not the latter, performing the necessary actions (including copying if necessary) at open time to avoid having to interfere with reads, writes, seeks, locking and synchronization. This is done not only for efficiency but also to permit the memory-mapping APIs of the OS to operate without the need for a fine-grained intervention by the virtualizer.

For those APIs that are intercepted, the virtualizer makes a decision based on path name, registry key, etc., as to whether the request falls within the virtual machine image or not. If it does, the request is handled. But, if not, the request is passed through unchanged to the operating system. Thus, PDS assets can communicate via the local file system with each other, with non-PDS programs, and with OS utilities.

Figure 5:
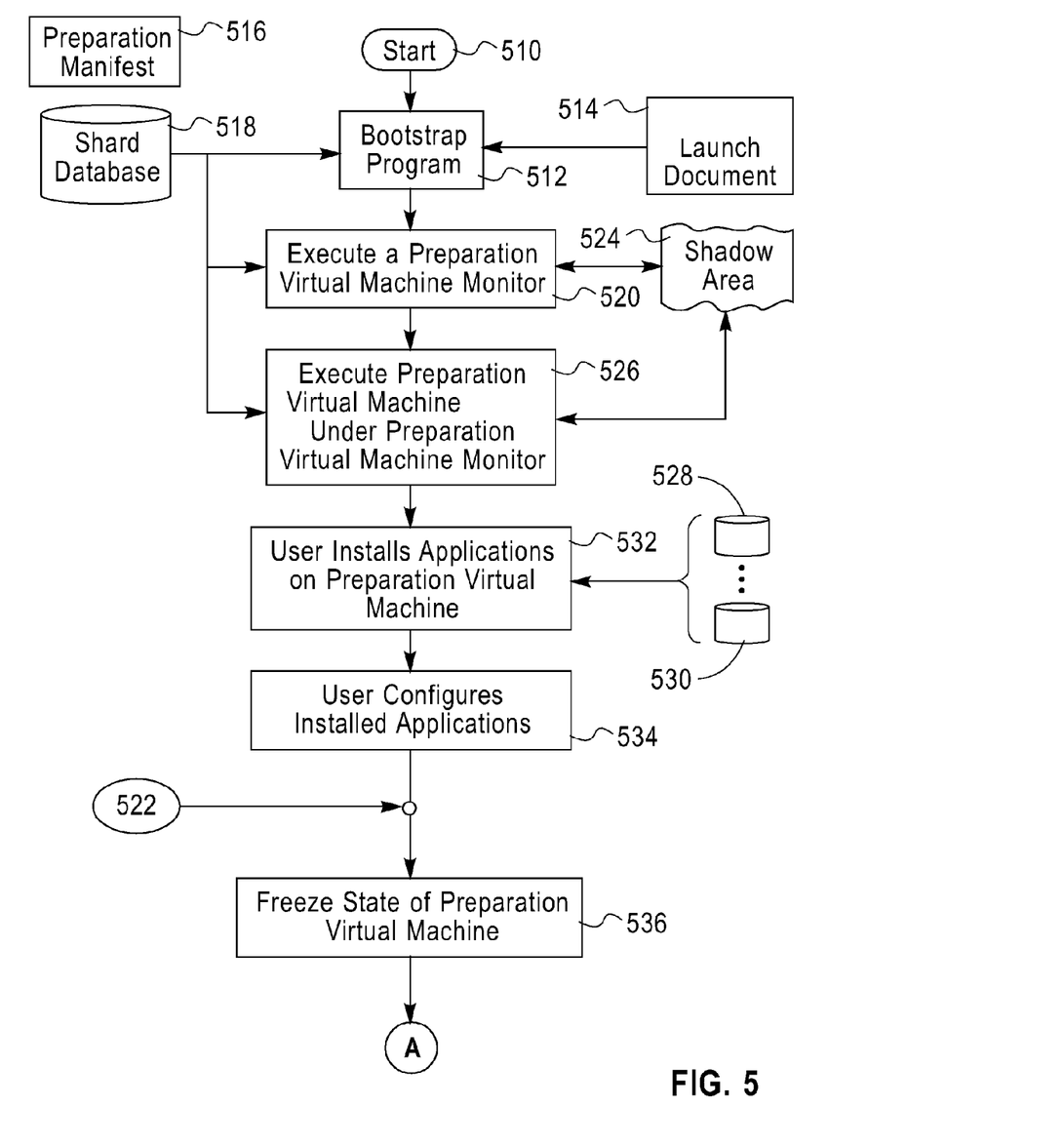
FIG. 5 is a flowchart of one embodiment of the method of the invention indicating the steps for creating a new virtual machine image.

FIG. 5 which is a flowchart of one embodiment of the invention. The present method starts at 510. The PDS player (bootstrap program) 512 is loaded on a client machine and executed. It uses a launch document 514 to bring down and execute a preparation Virtual Machine Monitor (VMM), at 520. Shards from shard database 518 and information from preparation manifest 516 are obtained. Artifacts created or modified by the VMM are deflected to a shadow area 524. The VMM maintains the fiction that these artifacts are part of the shared environment between the virtual machine and the host machine. The VMM preferably brings up a clean 'empty' bare virtual machine as a preparation virtual machine. In one embodiment, the preparation virtual machine provided to the user comprises the preparation VMM. PDS assumes that the OS of the preparation host machine is available on the user's client machine. At 526, a preparation virtual machine is executed under the preparation virtual machine monitor and provided to the user. The initial state of the preparation virtual machine has already been checkpointed At 532, the user installs various applications on this preparation virtual machine. In one embodiment, installation files are acquired from a remotely mounted file system 528, or network 530, or by some other means. In yet another embodiment, some installation files may be acquired by dragging and dropping into the preparation virtual machine. Registry entries and other system and environment variables are also added either implicitly during the installation process or explicitly by the user.

Figure 6:
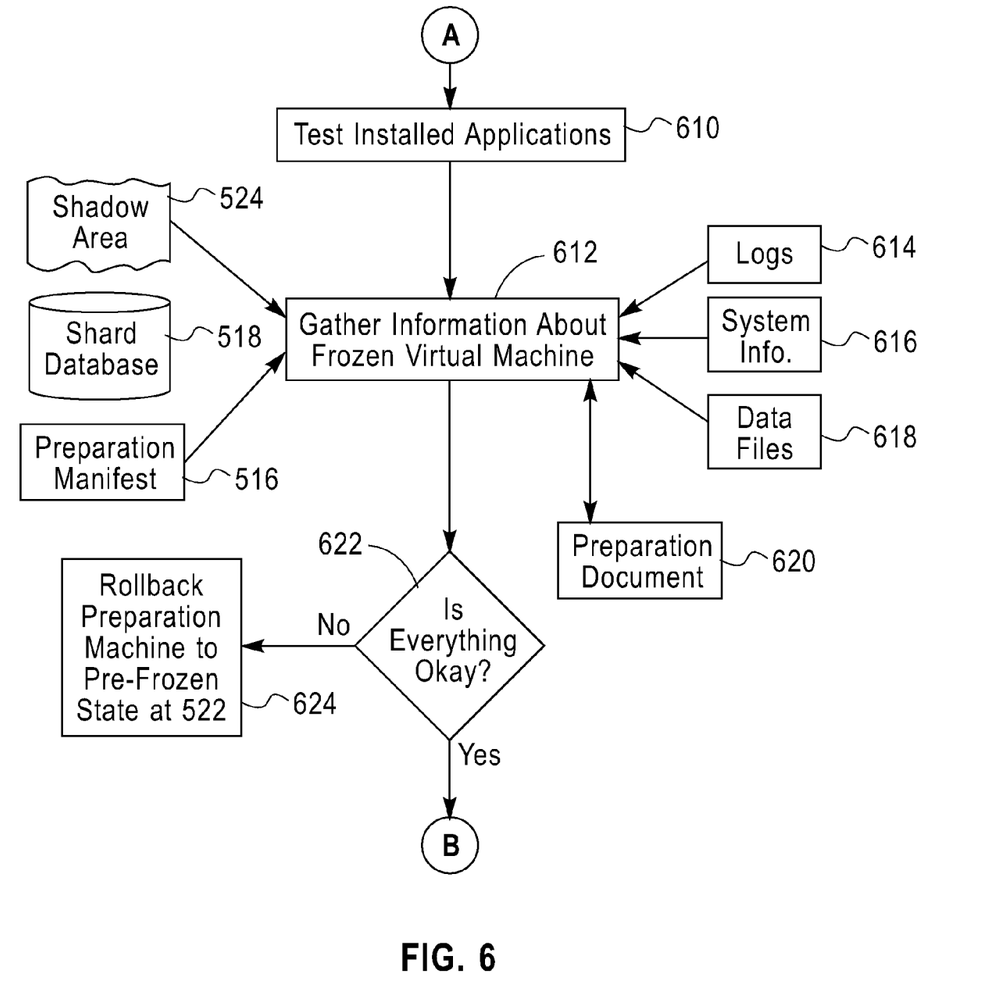
FIG. 6 is a continuation of the flowchart of the embodiment of FIG. 5.

It is important that artifacts (files, registry keys, values, and the like) required by the installed applications, components, and dependencies are also identified in the preparation document 620. Artifacts not required are not documented because these do not have to be included in the new virtual machine image. In an alternative embodiment, the preparation virtual machine operates in a special mode in which it simply records all new files, registry entries, environment variables, and other artifacts generated during application installation. In one embodiment, a mechanism is provided to assist the user in pruning unwanted artifacts.

At 534, the user configures the installed applications as desired. The preparation virtual machine is then frozen, at 536.

Reference is now being made to FIG. 6.

The installed applications can then be tested on the frozen machine, at 610. If testing the installed applications occurred before the state of the preparation virtual machine was frozen then unwanted artifacts introduced by testing would be introduced into the frozen virtual machine. If this is acceptable the application may be tested before the virtual machine is frozen. If the user has determined that an installed application does not run properly then the frozen preparation virtual machine can be unfrozen and the problem corrected.

At 612, information and resources obtained since the creation of the bare preparation virtual machine are gathered. These include artifacts stored in the VMM's shadow area 524, information from the preparation manifest 516 for the preparation virtual machine. Artifacts that have been required, but not modified, (i.e., read) by the VMM are identified from special read logs 614 maintained by the preparation VMM. System related information 616 and other information data 618 regarding the preparation virtual machine are obtained. A preparation document 620 is created.

A determination, at 622, is made as to whether anything is missing. If it is determined that some variable or dependency is not found then the state of the preparation virtual machine can be rolled back 624 to state prior 522 to which it was frozen and any deficiencies corrected. The read log need not be rolled back. If everything is okay then a virtual machine image can be created from the frozen preparation virtual machine. Normally the preparation virtual machine is stripped of the functionality used in its preparation. Alternatively, the preparation virtual machine includes some or all of the preparation functionality.

Figure 7:
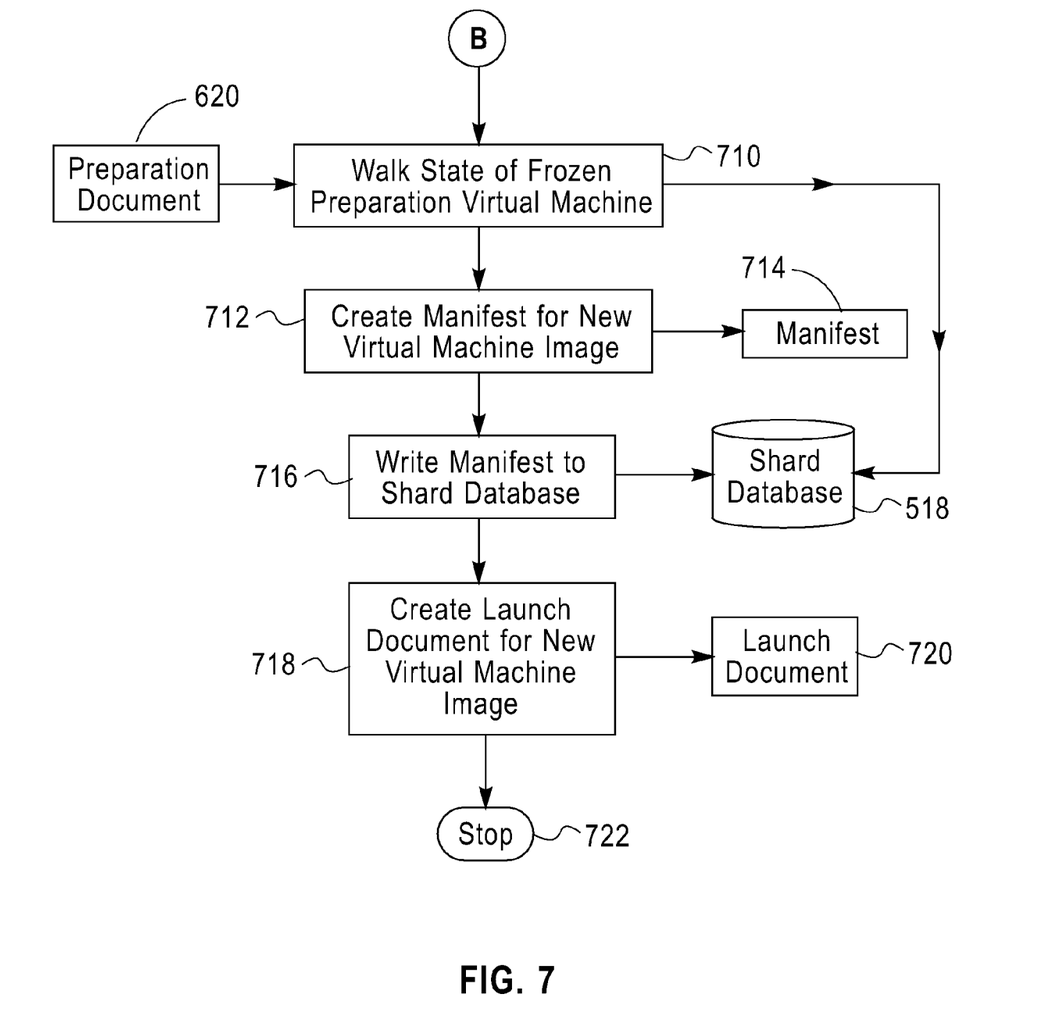
FIG. 7 is a continuation of the flowchart of the embodiment of FIG. 6.

Reference is now being made to FIG. 7.

At 710, the preparation virtual machine uses the information contained in the preparation document 620 and walks the state of the preparation virtual machine. In one embodiment, this entails visiting each object visible to the user, creating shards from each object, getting shard identifiers for each shard, adding new shards into the shard database 518, and mapping object to each shard identifier to build up a manifest. At 712, a new manifest is created for the new virtual machine image. Manifest 714 maps hierarchical names for entities (files, etc.) into shard identifiers. The new manifest reflects the state of the preparation virtual machine as it appeared to the user at the time it was frozen. At 716, the manifest itself is mapped into a shard identifier and stored in shard database 518.

At 718, launch document 720 is created for the new virtual machine image. This launch document can be used by a PDS player. Once the virtual machine image is launched, the user will be presented with a virtual machine having the same state of the preparation virtual machine as it appeared to the user at the time it was frozen. The virtual machine image will be a new populated virtual application that encapsulates the applications installed, configured, and tested by the user. This virtual machine image can be run as a new PDS asset. The method ends at 722.

When the PDS player is run, the VMM brings down and executes the virtual machine image and any of its software dependencies that execution requires. The shards may be prefetched from the server into the client's local cache before they are required. Shards are cached on the client so that, if they are needed in the future, they are readily available locally. Allowing shards to be opened directly in the cache improves efficiency, when it is possible to do so, and is key to achieving low overhead.

Some assets modify their virtual machine image during execution, and count on being able to do so persistently.

Recall that the virtual machine image is stored as a set of shards and that these shards may be in a shard repository that has been directly exposed to the executor. This repository may be read-only and/or shared across machines. Even if the shards are in a local writable cache, they are potentially shared by multiple assets. Even within an asset, a single shard may represent multiple virtual entities that happen to have the same bit pattern. Thus, the PDS's base virtualizer cannot allow shards to be modified in place. Instead, it uses shadow areas, which are persistent stores in the local machine containing virtual entities that started out as shards but have since been modified by the asset. The file shadow area is a file tree on local disk. The registry shadow area is kept within the registry itself and other forms of system metadata may require still other forms of shadow area. In a preferred embodiment, entities from the host machine that are modified are also moved to the shadow area and entities from the host environment that are accessed but not modified are identified in a special read log.

As pointed out earlier, a single shard can represent many virtual resources. The contents of two virtual files that share the same bit pattern will be represented by the same shard. These files can have different names, creation dates, permission attributes, etc. Thus, APIs that involve the retrieval of metadata about files cannot just be redirected to a shard but must be emulated. PDS stores file metadata in separate metashards generated from the file trees of the virtual machine image at prepare time. The shard containing the contents of the file does not have to be present in order to answer many queries about the file. This can improve performance substantially. PDS retains handles that are open to shards in an efficient lookaside table. While it allows most handle directed requests to pass immediately to the OS, those that retrieve metadata must be intercepted and emulated. Handle-close operations are intercepted in order to remove handles from the table.

PDS's virtual machine execution model supports multiple processes executing within the same virtual machine. Such processes cannot be isolated from each other, but must be able to communicate through the virtual machine image. For example, all file sharing and file locking capabilities must execute correctly between the processes of an asset, even though spurious sharing violations must be avoided between processes in different assets.

Recall that each virtual machine has its own file area, where any shards modified by that asset are copied. PDS ensures that there is a one-to-one correspondence between virtual and real files within this area. This makes the OS responsible for all sharing semantics in the shadow area and even for file metadata retrieval from this area, since there is no reason for PDS to be involved. As long as a virtual file is mapped to a shard, PDS will emulate the sharing semantics, just as for metadata retrieval. What makes this workable is that shards are copied to the shadow area, correct metadata assigned, and virtual operations shifted there, as soon as there is any potential for mutation. Once this shift has occurred, it is permanent for that virtual file of that asset. Thus, PDS is only required to provide correct read/read sharing, which is a much simpler problem than read/write and write/write sharing. It would even be a trivial problem except that Windows allows a reading process to exclude other readers. PDS's emulation ensures that this exclusion operates only at the virtual file level and only within an asset.

There are some additional complexities. First, the act of shifting from the shard cache to the shadow area for a particular virtual file must be done transactionally. Two processes of the same asset that independently decide to make this shift must not collide, and a process that is opening a file for reading must be directed to the shadow area copy if it exists, even though this shift may just have taken place in a different process. This is readily accomplished using system-provided inter-process synchronization facilities.

A more subtle problem involves the status of processes that open files for reading but with concurrent writing allowed. It is nearly impossible to determine whether this is being done so that concurrent writes can be observed, in which case the only safe course is to shift the virtual file to the shadow area immediately. Otherwise, another process could open the file for writing, shifting it to the shadow area and leaving the reading process's handle still open to the shard. The writing process would execute correctly, but the reading process would fail to see the changes. If it is assumed, conservatively, that all cases of read/write sharing require the readers to observe the writes, many files will be copied unnecessarily, since standard libraries tend to allow writing by default when opening for reading. Instead, PDS assumes by default that a reader does not care about concurrent writes even if they are allowed. The file is thus opened to the shard in this case. If the virtual file is later shifted to the shadow area while the original handle is still open, this potential safety problem is reported in a log. The asset can then be reprepared with information from the log made available.

Correct virtualization of the dynamic linking capabilities of the OS also requires work beyond merely redirecting file APIs. This happens because aspects of this linking are accomplished implicitly without any visible call to a system API. In Windows, executable images and libraries have import sections that refer to the export sections of other libraries (other OS's have similar facilities). So, lower level intercepts are needed to correctly ensure that imports are satisfied from the virtual machine image instead of the real local file system when appropriate. Fortunately, Windows provides the ability to load executables and libraries without resolving their imports and provides enough public information to allow some of this resolution to be performed manually. So, PDS is able to analyze the imports and determine, for each one, the correct module to load, either from the virtual machine image or from outside the virtual machine image.

Once the correct module to load has been identified, PDS can use normal system APIs to load the module. But, subsequent APIs that query the names of loaded modules must be intercepted to maintain the virtualization since the actual module loaded may be a shard in the shard cache, with an arbitrary name. Another noteworthy aspect of dynamic linking is its use of search paths to resolve the actual identity of the module to be loaded. In a PDS asset, the search path may include directories within the virtual machine image that don't actually exist in the local machine. Thus, the search itself must also be emulated.

In summary, a novel method is disclosed for capturing an installed state of a conventional application and converting the captured state into a virtual application. The novel method starts with a bare machine in a known state, preferably soon after the OS was installed. Installation scripts are used to install one or more software applications along with required components and dependencies. Other artifacts can be added and configured such as files, trees, directories, entries, data, values, among others. These also may include updates to various system databases, such as the Windows registry in which certain metadata is stored. The installed applications are tested and verified to work as desired. Undesired artifacts can be deleted manually or removed by the OS. The state of the virtual machine with the installed applications is captured. The installed applications can be tested on the frozen virtual machine. If the user determines that the installed applications are working properly, a virtual machine image is prepared and then written out. The resulting output is a new populated virtual application container that encapsulates the applications installed and configured by the user. If the user determines that one or more installed applications do not work properly during testing, then the frozen virtual machine can be unfrozen and any deficiencies corrected. The virtual machine image is stored as a launch document and a set of shards. The virtual machine image represents the state of the virtual machine along with the installed applications at the time the preparation virtual machine was frozen.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for creating a virtual machine image in a computer system, comprising:
   executing a virtual machine monitor;
   executing, under the virtual machine monitor, a preparation virtual machine, the preparation virtual machine being selectively virtualized above an operating system (OS) of a host system by the virtual machine monitor selectively intercepting certain file-related API's of the OS while allowing other API's to pass through unchanged to the OS;
   capturing an initial state of the preparation virtual machine, wherein the initial state of the preparation virtual machine is free of any artifacts created during execution of the virtual machine monitor;
   installing, after capturing the initial state of the preparation virtual machine, at least one application on the preparation virtual machine;
   capturing, by the preparation virtual machine, an installed state of the at least one application in response to installing the application on the preparation virtual machine, wherein the installed state of the application comprises artifacts generated in response to installing the at least one application on the preparation virtual machine, and wherein the artifacts of the installed state of the application are stored in a shadow area associated with the virtual machine monitor isolated from the host system;
   freezing, after the installed state is captured, the preparation virtual machine;
   testing, after the freezing of the preparation virtual machine, the at least one application on the preparation virtual machine, wherein the freezing prevents any artifacts generated based on the testing from being introduced onto the preparation virtual machine; and
   generating, by the preparation virtual machine after the testing, a virtual machine image representing the initial state of the preparation virtual machine and the installed state of the application.

2. A method as in claim 1, further comprising:
   storing the artifacts created during execution of the virtual machine monitor in the shadow area associated with the virtual machine monitor.

3. A method as in claim 1, wherein the preparation virtual machine further comprises at least a portion of the virtual machine monitor.

4. A method as in claim 1, wherein the preparation virtual machine further comprises applications pre-installed thereon.

5. A method as in claim 1, further comprising:
   generating a plurality of shards and writing the shards to a database, wherein the shards are based on at least the artifacts generated in response to installing the at least one application on the preparation virtual machine.

6. A method for creating a virtual machine image in a computer system, comprising:
   executing a virtual machine monitor;
   generating a preparation virtual machine operating on an operating system;
   executing the preparation virtual machine under the virtual machine monitor, the preparation virtual machine being selectively virtualized above the operating system (OS) of a host system by the virtual machine monitor selectively intercepting certain file-related API's of the OS while allowing other API's to pass through unchanged to the OS;
   capturing an initial state of the preparation virtual machine, wherein the initial state of the preparation virtual machine is free of any artifacts created during execution of the virtual machine monitor;
   installing, after capturing the initial state of the preparation virtual machine, an application onto the preparation virtual machine;
   capturing, by the preparation virtual machine, an installed state of the application in response to installing the application on the preparation virtual machine, wherein the installed state of the application comprises artifacts generated in response to installing the at least one application on the preparation virtual machine, and wherein the artifacts of the installed state of the application are stored in a shadow area associated with the virtual machine monitor isolated from the host system;
   freezing, after the installed state is captured, the preparation virtual machine;
   testing, after the freezing of the preparation virtual machine, the application on the preparation virtual machine, wherein the freezing prevents any artifacts generated based on the testing from being introduced onto the preparation virtual machine;
   generating, after the testing and based on the captured installed state of the application, a preparation document, wherein the preparation document at least identifies artifacts required by the application and dependencies associated with the application; and
   generating, by the preparation virtual machine, a virtual machine image representing the initial state of the empty preparation virtual machine and the installed state of the application.

7. A method as in claim 6, the virtual machine monitor is executed by a bootstrap program, the bootstrap program receiving an instruction from a launch document.

8. A method as in claim 6, further comprising:
   generating a plurality of shards and writing the shards to a database, wherein the shards are based on at least the artifacts generated in response to installing the at least one application on the preparation virtual machine.

9. A method as in claim 6, further comprising:
   creating a new manifest for the virtual machine image and generating a plurality of shards and writing the shards to a database.

10. A method as in claim 6, further comprising:
   traversing a set of objects, based on the preparation document, in the preparation virtual machine, wherein the set of objects is visible to a user;

rendering each object in the set objects, which is encountered during the traversing, as a set of shards;
storing the set of shards in a database;
creating a manifest which maps the objects to a set of identifiers associated with the set of shards; and
creating at least one launch document for the virtual machine image.

11. A computer system for creating a virtual machine image, comprising:
a memory; a data storage medium;
a processor in communication with said memory and the data storage medium, executing an operation system (OS), the OS executing a virtual machine monitor; and
a machine readable medium comprising an instruction set executable by the processor, the instruction set comprising:
executing, under the virtual machine monitor, a preparation virtual machine, the preparation virtual machine being selectively virtualized above the OS by the virtual machine monitor selectively intercepting certain file-related API's of the OS while allowing other API's to pass through unchanged to the OS;
capturing an initial state of the preparation virtual machine, wherein the initial state of the preparation virtual machine is free of any artifacts created during execution of the virtual machine monitor;
installing, after capturing the initial state of the preparation virtual machine, at least one application on the preparation virtual machine;
capturing, by the preparation virtual machine, an installed state of the application in response to installing the application on the preparation virtual machine, wherein the installed state of the application comprises artifacts generated in response to installing the at least one application on the preparation virtual machine, and wherein the artifacts of the installed state of the application are stored in a shadow area associated with the virtual machine monitor isolated from the host system;
freezing, after the installed state is captured, the preparation virtual machine;
testing, after the freezing of the preparation virtual machine, the application on the preparation virtual machine, wherein the freezing prevents any artifacts generated based on the testing from being introduced onto the preparation virtual machine; and
generating, by the preparation virtual machine, after the testing a virtual machine image representing the initial state of the preparation virtual machine and the installed state of the application.

12. A computer system as in claim 11, the preparation virtual machine further comprising at least a portion of the virtual machine monitor.

13. A computer system as in claim 11, further comprising:
generating a plurality of shards and writing the shards to a database, wherein the shards are based on at least the artifacts generated in response to installing the at least one application on the preparation virtual machine.

14. A non-transitory machine readable storage medium comprising an instruction set executable by a computer system for creating a virtual machine image, the instruction set comprising:
executing a virtual machine monitor;
executing, under the virtual machine monitor, a preparation virtual machine, the preparation virtual machine being selectively virtualized above an operating system (OS) of a host system by the virtual machine monitor selectively intercepting certain file-related API's of the OS while allowing other API's to pass through unchanged to the OS;
capturing an initial state of the preparation virtual machine, wherein the initial state of the preparation virtual machine is free of any artifacts created during execution of the virtual machine monitor;
installing, after capturing the initial state of the preparation virtual machine, at least one application on the preparation virtual machine;
capturing, by the preparation virtual machine, an installed state of the application in response to installing the application on the preparation virtual machine, wherein the installed state of the application comprises artifacts generated in response to installing the at least one application on the preparation virtual machine, and wherein the artifacts of the installed state of the application are stored in a shadow area associated with the virtual machine monitor isolated from the host system;
freezing, after the installed state is captured, the preparation virtual machine;
testing, after the freezing of the preparation virtual machine, the at least one application on the preparation virtual machine, wherein the freezing prevents any artifacts generated based on the testing from being introduced onto the preparation virtual machine; and
generating, by the preparation virtual machine after the testing, a virtual machine image representing the initial state of the preparation virtual machine and the installed state of the application.

15. A non-transitory machine readable storage medium as in claim 14, further comprising:
traversing the artifacts of the installed state of the application, wherein the artifacts comprise at least one of a file system, registry keys, and environment variables;
rendering objects encountered during the traversing as shards;
storing the shards in a database of shards;
creating a manifest which maps a set of hierarchical names of the objects to a set of identifiers associated with the shards for said objects; and
creating at least one launch document for the virtual machine image.

16. A non-transitory machine readable storage medium as in claim 14, further comprising:
generating a plurality of shards and writing the shards to a database, wherein the shards are based on at least the artifacts generated in response to installing the at least one application on the preparation virtual machine.

* * * * *